United States Patent [19]

Carmichael et al.

[11] Patent Number: 4,551,823
[45] Date of Patent: Nov. 5, 1985

[54] METHOD AND APPARATUS FOR ACOUSTIC CEMENT BOND LOGGING

[75] Inventors: Jerry H. Carmichael; Charles H. Wellington, both of Houston, Tex.

[73] Assignee: Dresser Industries, Inc., Dallas, Tex.

[21] Appl. No.: 322,783

[22] Filed: Nov. 19, 1981

[51] Int. Cl.$^4$ .............................................. G01V 1/40
[52] U.S. Cl. .................................. 367/35; 181/105; 367/28
[58] Field of Search .............. 181/105, 104; 367/7.9, 367/30, 34, 35, 86, 59, 28

[56] References Cited

U.S. PATENT DOCUMENTS

| | | | |
|---|---|---|---|
| 3,291,248 | 12/1966 | Majani et al. | 367/35 |
| 3,292,146 | 12/1966 | Dewan | 367/35 |
| 3,401,772 | 9/1968 | Kokesh | 367/35 |
| 3,401,773 | 9/1968 | Synnott | 367/34 |
| 3,714,590 | 1/1973 | Freeman et al. | 367/59 |
| 4,255,798 | 3/1981 | Havira | 367/35 |
| 4,382,290 | 3/1983 | Havira | 181/104 |

OTHER PUBLICATIONS

M. Grosmangin et al., "A Sonic Method for Analyzing the Quality of Cementation of Borehole Casings", Journal of Petroleum Technology, Feb. 1961, pp. 165-171.
Pardue et al., "Cement Bond Log-A Study of Cement and Casing Variables", Journal of Petroleum Technology, May (1963), pp. 545-555.
Advertisement by Gearhart Industries, Inc., located in Mar. 1981, edition of Petroleum Engineer International.

*Primary Examiner*—Salvatore Cangialosi
*Assistant Examiner*—K. R. Kaiser
*Attorney, Agent, or Firm*—Patrick H. McCollum; Richard M. Byron

[57] ABSTRACT

A logging instrument is caused to traverse a cased earth borehole periodically emitting and receiving acoustic energies, such instrument generating an electrical signal containing one or more electrical alternations representative of the received acoustic energies, and such alternations having an amplitude generally functionally related to the attenuation of the acoustic energies as they traverse the casing within the borehole. A significant portion of these alternations is determined and digitized, and the individual digitized values therein summed together to yield a functional representation of the signal area of the alternations of a predetermined polarity within the significant portion. This signal area is then compared to the area which would be indicated if the casing were free of cement bonding, the comparison yielding an indication of the relative degree of bonding of cement to the casing within the borehole.

9 Claims, 4 Drawing Figures

METHOD AND APPARATUS FOR ACOUSTIC CEMENT BOND LOGGING

BACKGROUND OF THE INVENTION

This invention relates generally to acoustic well logging methods and apparatus and, more particularly, to an improved method and apparatus for acoustically determining bonding characteristics of cement surrounding a cased borehole penetrating an earth formation.

When an earth borehole is drilled for the purpose of producing oil, gas, or other fluids, it is common practice to set casing in the borehole before the production begins. To set the casing, after the casing has been placed in the borehole, cement is pumped into the annulus between the casing and the borehole formation. Optimally, the cement bonds both to the casing and to the formation, thereby holding the casing securely in place and also sealing the earth formations, isolating the different strata in the formation from one another. This isolation prevents the migration of fluids from one strata to another and allows production to be obtained from only those strata or zones as are desired. This production is then achieved by perforating the casing and surrounding cement annulus at the depth of the desired zone, thereby providing a means for any fluid contained therein to enter the casing.

For various reasons, when the cement is pumped into the annulus around the casing, the cement may fail to fully occupy the annulus, thereby defeating the desired effects described above. It is desirable, therefore, to have information indicating the quality of the cement bonding, both to the casing and to the surrounding formation so that remedial actions may be taken if warranted. This information is obtained by operations known commonly in the industry as cement bond logging.

A common technique of cement bond logging involves the use of a logging instrument containing both a transmitter and a receiver of acoustic energy. The transmitter releases acoustic energies into the borehole and thereby into the casing and the surrounding formation. The acoustic energies traverse these mediums until they reach the receiver which transforms the energies into a signal composed of a series of electrical alternations. These alternations will vary in amplitude and form depending upon the route traversed by the acoustic energies from the transmitter to the receiver. In most cases the energies which first arrive at the receiver will be those which traverse the casing rather than those acoustic energies which traverse the formation. Where the casing is free, i.e., unbonded to the cement, the acoustic energies will traverse the casing freely with little attenuation and thus the signal alternations from the receiver representing these acoustic energies first traversing the casing, such alternations being commonly known as casing arrivals, will be at a maximum relative amplitude. However, where the casing is securely bonded to the cement, the acoustic energies traversing the casing will be greatly attenuated and the alternations representative thereof comparatively small. Similarly, intermediate degrees of bonding are reflected in the receiver signal by amplitudes of proportionally intermediate excursion.

Cement bond logging techniques typically also include indications of the alternations representative of later energies which typically are those traversing the surrounding formations between the transmitter and the receiver. These later alternations, commonly known as formation arrivals, may be used to evaluate the quality of the cement bond to the earth formation. A lack of cement bonding to the formation will limit the excursion of the acoustic energy to the formation and there will be virtually no formation arrivals detected by the receiver. Partial cement-formation bonding will usually be evidenced by a reduction in number and amplitude of the formation arrivals as compared to formation arrivals observed under conditions of good cement-formation bonding.

It will be noted that occasionally formations are encountered which exhibit qualities of exceptionally high velocity acoustic energy transfer due to conditions such as exceptional hardness or compaction of the formation. When logging these formations the formation arrivals may either precede or occur simultaneously with the casing arrivals, thereby interfering with and obscuring the amplitudes of the casing arrivals. Because signal alternations which either occur prior to the expected casing arrivals or have an amplitude greater than the amplitudes typical of free casing are indicative of such high velocity formations, where this phenomenon occurs it is typically determinable from the data taken of the formation arrivals. The relative degree of casing-cement bonding is typically not a critical parameter in such a situation because the fast travel of the acoustic energy to and from the formation is accomplished only by good acoustic coupling and is therefore evidence of an acceptable level of casing-cement bonding.

Prior art has attempted to determine the quality of the bonding of the cement to the casing by measuring the amplitude excursion of the signal alternations evidencing the arrival of the casing energies. The amplitude excursion of one or more of these early signal alternations is used as the measure of the attenuation of the acoustic energies traversing the casing and therefore of the degree of casing-cement bonding. Commonly in cement bond logging operations, a number of these signals are generated as the instrument traverses the borehole. The relative amplitude of at least one of the casing arrivals of each of these signals is then commonly displayed as a continuous curve which is correlated to the depth of the instrument within the well while the waveforms of the formation arrivals are graphically presented at selected depth intervals. In U.S. Pat. No. 3,401,773, issued to Synnott, a method is disclosed of cement bond logging by means of acoustic energy impulses as discussed above, and, for determining cement bonding to casing specifically by examination of the amplitude excursion of a first significant alternation or casing arrival of the receiver signal. A similar type of operation also employing an amplitude excursion measurement is disclosed in U.S. Pat. No. 3,292,146, issued to Dewan.

One problem with this amplitude excursion type of measurement is inaccuracies introduced into the measurement by signal noise. In addition to noise due to digital processing and generally high gain-type amplifiers, a source of noise inherent in cement bond logging operations is "road noise" caused by the centralizers used to position the logging instrument centrally within the well. As the logging instrument is caused to traverse the well, the sliding of the centralizers against the casing generates acoustic energies detectable by the receiver within the instrument. The noise then becomes an undesirable component of the receiver signal. The signal noise can either increase or decrease the amplitude of the actual signal at any given point within that signal. It can be readily appreciated that when the maximum amplitude excursion of any given portion of the receiver signal is used as the measure of the attenuation of these casing-traversing energies, an alteration in that maximum amplitude excursion due to this noise creates an erroneous indication of the degree of such attenuation, yielding a functionally erroneous indication of the degree of casing-cement bonding.

Accordingly, the present invention overcomes the deficiencies of the prior art by providing a reliable method and apparatus for surveying a casing-cement bond, such method and apparatus minimizing inaccuracies caused by the effects of signal noise upon the receiver signal.

SUMMARY OF THE INVENTION

Method and apparatus for measuring cement to casing bonding within a borehole according to the present invention includes causing acoustic energies to traverse a portion of the casing and generating an electrical signal containing one or more significant alternations, such significant alternations bearing a functional indication of the degree of attenuation of such acoustic energies as the energies traverse such a portion of the casing. This electrical signal is digitized and a significant portion of the electrical signal is defined in relation to at least one of the significant alternations contained within the electrical signal. The area beneath one polarity of the alternations within the significant portions of the signal is then determined by summing the appropriate digitized amplitude values comprising such polarity of alternations. This computed area is then compared to the area which would be represented if the acoustic energy were traversing casing which was virtually unbonded to cement. This comparison is then expressed as a percentage of unbonded casing and is graphically displayed on a cathoderay tube or plotter.

DETAILED DESCRIPTION OF THE PREFERRED EMBODIMENT

Figure 1:
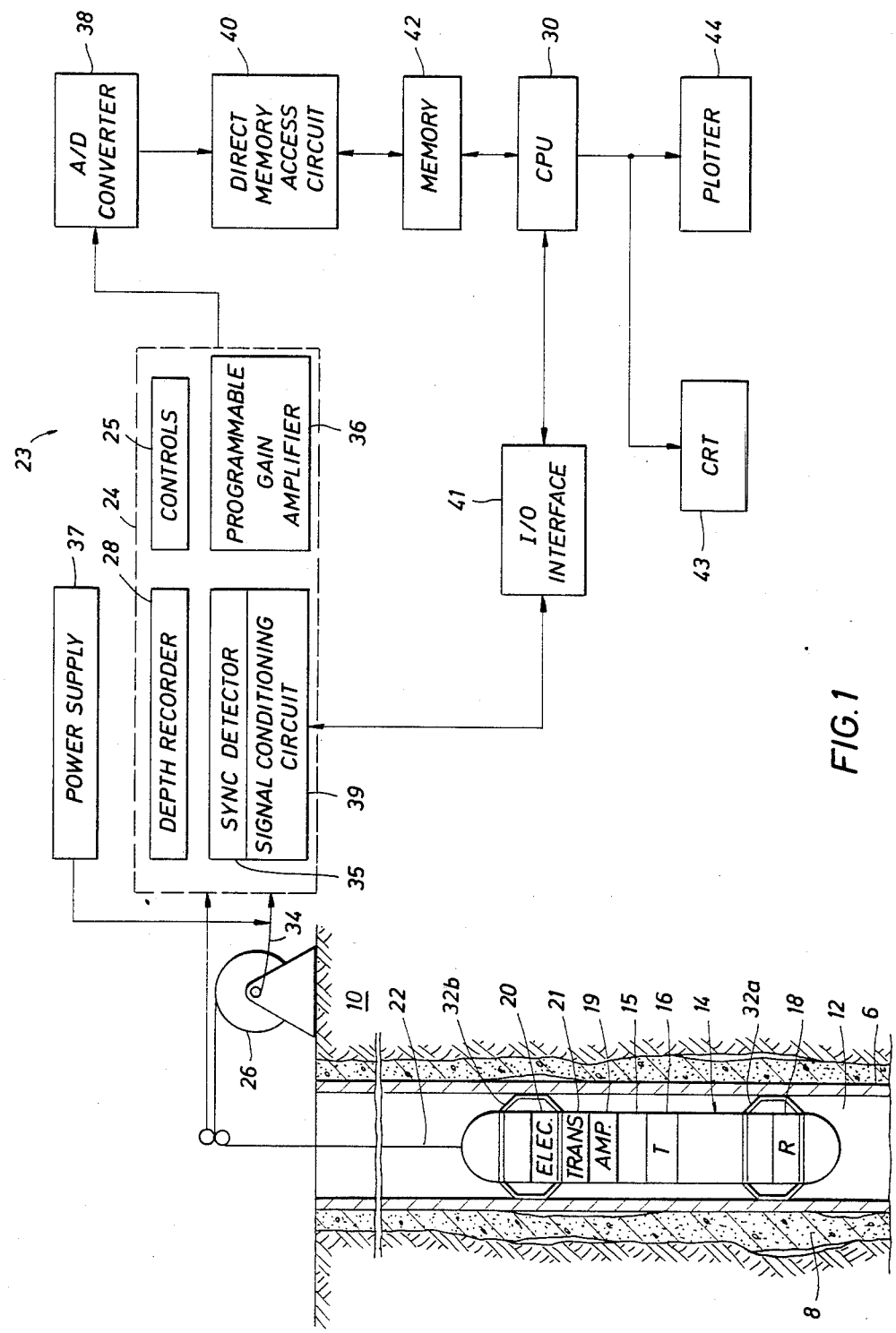
FIG. 1 is a schematic representation of a logging system in accordance with the present invention with the subsurface portion of the system shown disposed within a cased earth borehole which is shown in vertical section.

Referring now to the drawings in more detail, particularly to FIG. 1, therein is illustrated schematically a cement bond logging operation in accordance with the present invention wherein the casing 6, the cement 8, and the earth formation 10 are shown in vertical section. Disposed within the well 12 is the subsurface instrument 14 of the well logging system. Subsurface instrument 14 is suspended within well 12 by a conventional logging cable 22 containing means for communicating electrical signals between the subsurface instrument 14 and the control panel 24 on the surface. The subsurface instrument 14 is caused to traverse the well 12 by winding or unwinding cable 22 from hoist 26, around which cable 22 is spooled. Subsurface instrument 14 is maintained approximately centralized within the well 12 by centralizers 32a, 32b which are constructed of a suitable non-acoustically conductive material, preferably rubber.

Subsurface instrument 14 comprises an elongated body member 15, a transmitter of acoustic energy 16, a receiver of acoustic energy 18 which is suitably acoustically isolated from the acoustic transmitter 16, and an electronics section 20. Acoustic transmitter 16 is adapted to be periodically activated at a preset repetition rate, preferably approximately each 16 milliseconds and, upon such activation, to emit bursts of acoustic energies into the borehole. These emitted acoustic energies are of a suitable frequency, preferably between 12 KHz and 22 KHz, most preferably 20 KHz. These energies traverse paths through both the casing and the surrounding formations to reach the acoustic receiver 18 in a manner familiar to the art. For each activation of transmitter 16, receiver 18 receives the acoustic energies and transforms them into an electrical signal composed of a series of electrical alternations, such alternations having an amplitude functionally related to the intensity of the acoustic energies at the time they reach the receiver 18. This receiver signal is then coupled to electronics section 20 wherein a sync pulse, corresponding in time to the commencement of the transmitter activation which released those acoustic energies, is added to the signal from receiver 18 to form a composite electrical signal evidencing the timing and intensity of the acoustic energies received from an individual activation of transmitter 16. These composite electrical signals are then amplified by subsurface amplifier 19 for transmission over cable 22 to the surface.

Subsurface instrument 14 is preferably designed to be powered by a direct current, most preferably by a direct current source of 150 volts which is supplied by a power supply 37 located on the surface. So that the subsurface instrument 14 may be operated through use of a single conductor logging cable 22, the signals from subsurface instrument 14, are communicated to the surface electronics 23 super-imposed upon the 150 volt d.c. voltage level being communicated from the power supply 37 downhole to operate the subsurface instrument 14. The signal is communicated to cable 22 while the receiver 18 and subsurface amplifier 19 are maintained electrically isolated from the d.c. voltage level on cable 22 in a conventional manner by means of a decoupling transformer 21. It should be noted that receiver 18, subsurface amplifier 19 and decoupling transformer 21 are adapted in a conventional manner to assure that the amplitudes of the alternations of the electrical signal communicated to cable 22 bear a functional proportional relationship to the intensity of the acoustic energies which these alternations represent.

The surface electronics 23 of the logging system is illustrated in FIG. 1 in block diagram form. Subsurface instrument 14 is electrically coupled to control panel 24 by means of cable 22 and an electrical extension 34 thereof. Contained within control panel 24 are a depth recorder 28, a signal conditioning circuit 39, a programmable gain amplifier 36, and the controls 25 necessary to operate the subsurface instrument 14 within the well 12. Also included within control panel 24 is a sync detection circuit 35 of a conventional type. The sync detection circuit 35 detects the sync pulse in the signal from subsurface instrument 14 as directed by the CPU 30 as will be described later herein. In the preferred embodiment of the invention, CPU 30 is a digital computer. Control panel 24 communicates with CPU 30 by means of I/O interface 41. Depth recorder 28 determines the extent to which subsurface instrument 14 is raised or lowered within well 12 and communicates such determinations to CPU 30 at selected increments of depth corresponding to the desired survey rate for the log, preferably each one-quarter foot. Signal conditioning circuit 39 removes the receiver signal from the 150 volt d.c. level described above such that the signal emerges from the signal conditioning circuit 39 as a series of voltage alternations across an axis of zero voltage. This signal is then coupled to programmable gain amplifier (PGA) 36 wherein the maximum voltage of the signal alternations is established at a preset level by the CPU 30 as will be described later herein in the discussion of the calibration routine (indicated generally at 83 in FIG. 2) of the logging system. The signal is then communicated to a high speed analog to digital (A/D) converter 38 of suitable resolution capability, preferably at least 8-bit resolution, which digitizes the amplitude of the signal at an established sample rate, preferably every 2 microseconds. The digitized signal is then transferred, by means of the direct memory access circuit (DMA) 40, to a suitable memory unit 42, preferably a digital computer memory in communication with CPU 30. The DMA 40 allows the numerous samples made by the A/D converter 38 to be placed directly into the memory 42 at a rapid rate. The CPU 30 processes the data retained in the memory 42 in the manner described later herein and yields a signal which is graphically represented, at least in part, by plotter 44. This graphic representation may also be presented upon a cathode-ray tube (CRT) 43 for inspection and analysis simultaneous with the logging operation.

As discussed previously, the degree of bonding of the cement annulus to the casing is determined by reference to that portion of the signal from receiver 18 which represents the acoustic energies released by the activation of transmitter 16 which traverse the casing to reach receiver 18, i.e., that portion of the signal known as the casing arrivals. Also as discussed previously, signal noise can increase or decrease the apparent amplitude of these casing arrivals. To minimize the effects of such signal noise, the present invention determines the attenuation of the acoustic energies by reference to the area beneath one polarity of the amplitude excursions within a first significant portion of the receiver signal. In the preferred embodiment, this first significant portion of the receiver signal is located in reference to a first significant half-cycle of the casing arrivals. The use of the area within the amplitude excursions of the casing arrivals tends to average, and therefore minimize, the effects of signal noise upon the receiver signal.

Figure 4:
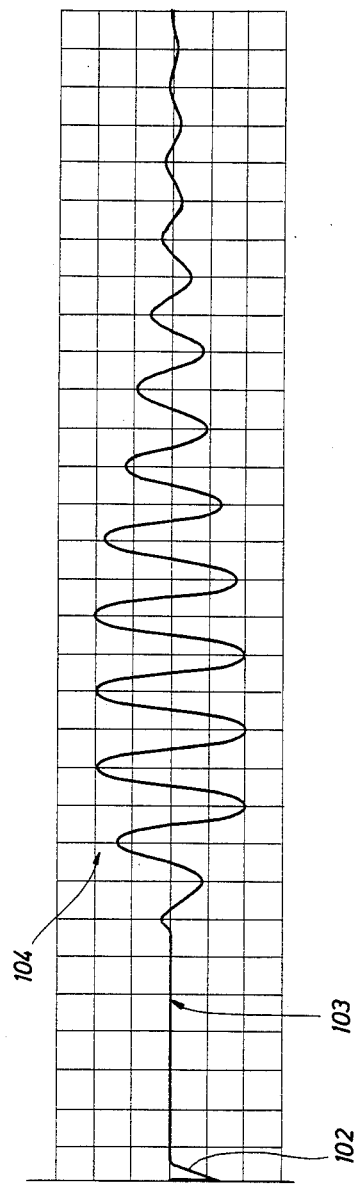
FIG. 4 is a general representation of a signal generated by the subsurface instrument under conditions of an absence of cement to casing bonding.

In the practice of the preferred embodiment of this invention, the logging operation is begun by calibrating the cement bond logging system within the well in which the log is to be run. This calibration is preferably to be done with subsurface instrument 14 located in the well 12 opposite a portion of the casing 6 which is both away from a collar and is free of cement bonding. A suitable portion of the casing in which to calibrate is chosen by operating subsurface instrument 14 within the well 12 and observing the signal showing the waveforms of the energy arrivals, such signal being displayed on the CRT 43. When the casing is free of binding, not only will the amplitude of the casing arrivals reach a maximum relative excursion but they will also generally achieve this maximum excursion within the first few discernable alternations or half-cycles, yielding a waveform giving a recognizable "signature" of such unbonded conditions. A signal containing waveforms of this description and similar to those indicative of free casing is shown in FIG. 4. The signal begins with a sync pulse 102 and contains a plurality of alternations 104 about a reference axis 103, such alternations representing the acoustic energies as described above. This waveform will not arise if the energies traverse a casing collar because of the poor acoustic coupling typical of such collars.

It is not uncommon to find free casing near the top of the borehole. If a survey taken at that point does not indicate an unbonded condition, subsurface instrument 14 should be traversed within the well 12 while examining the signal for the characteristics described above. It will be appreciated that if the portion of the casing determined to be free by such examination is not in fact totally free of cement bonding, the meaningfulness of the log will not be significantly impaired because the critical determination to be made by this casing arrival curve is the relative degree of casing-cement bonding. If the freest portion of casing does contain some degree of cement bonding, the percentage of unbonded casing will still be generally linearly represented in relation to that condition of partial bonding. Once this free, or freest, portion of casing is found, and subsurface instrument 14 located therewithin, the CPU 30 is utilized to complete the calibration of the cement bond logging system.

Figure 2:
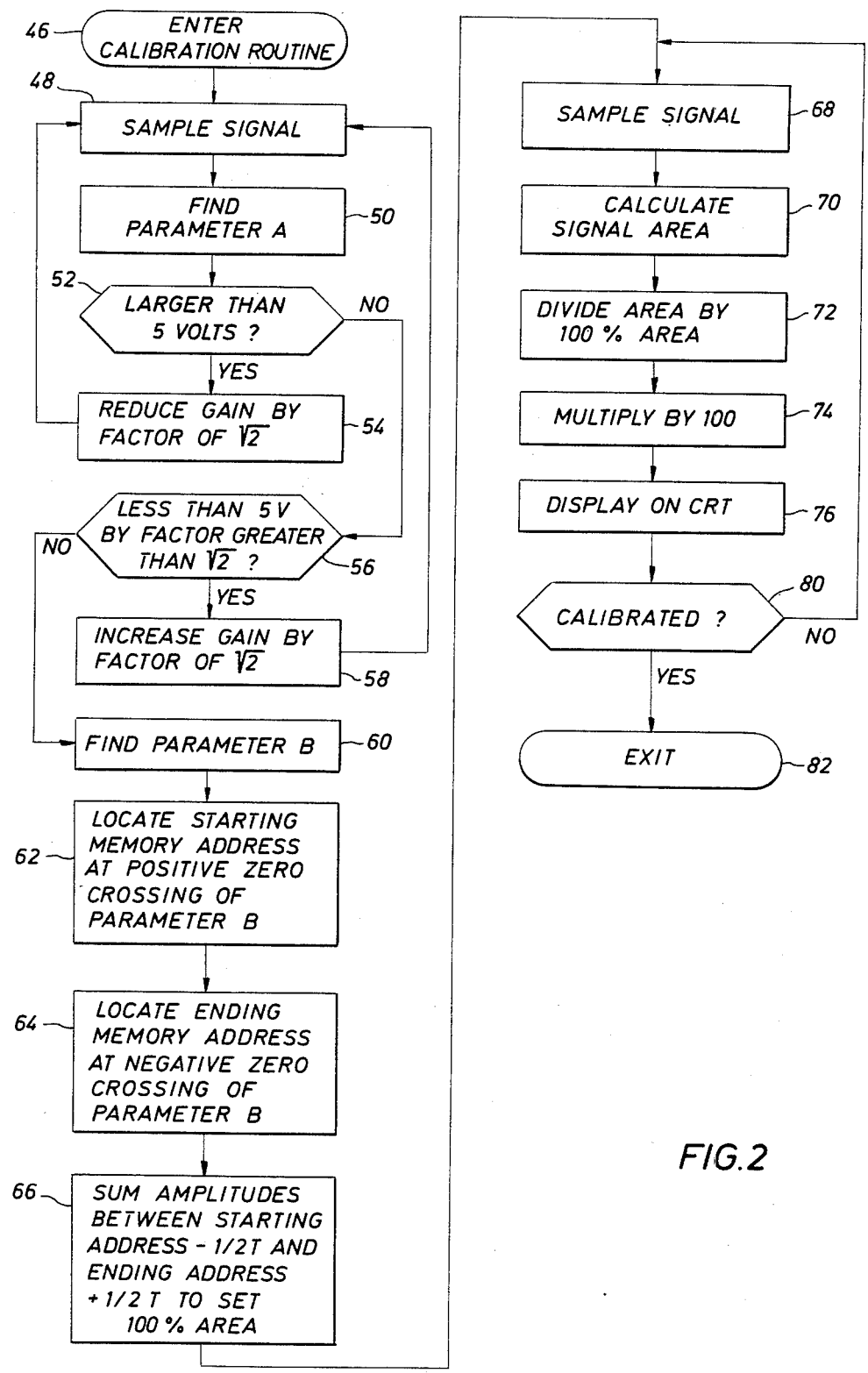
FIG. 2 is a flow chart of a calibration procedure utilized in the practice of the preferred embodiment of this invention.
Figure 3:
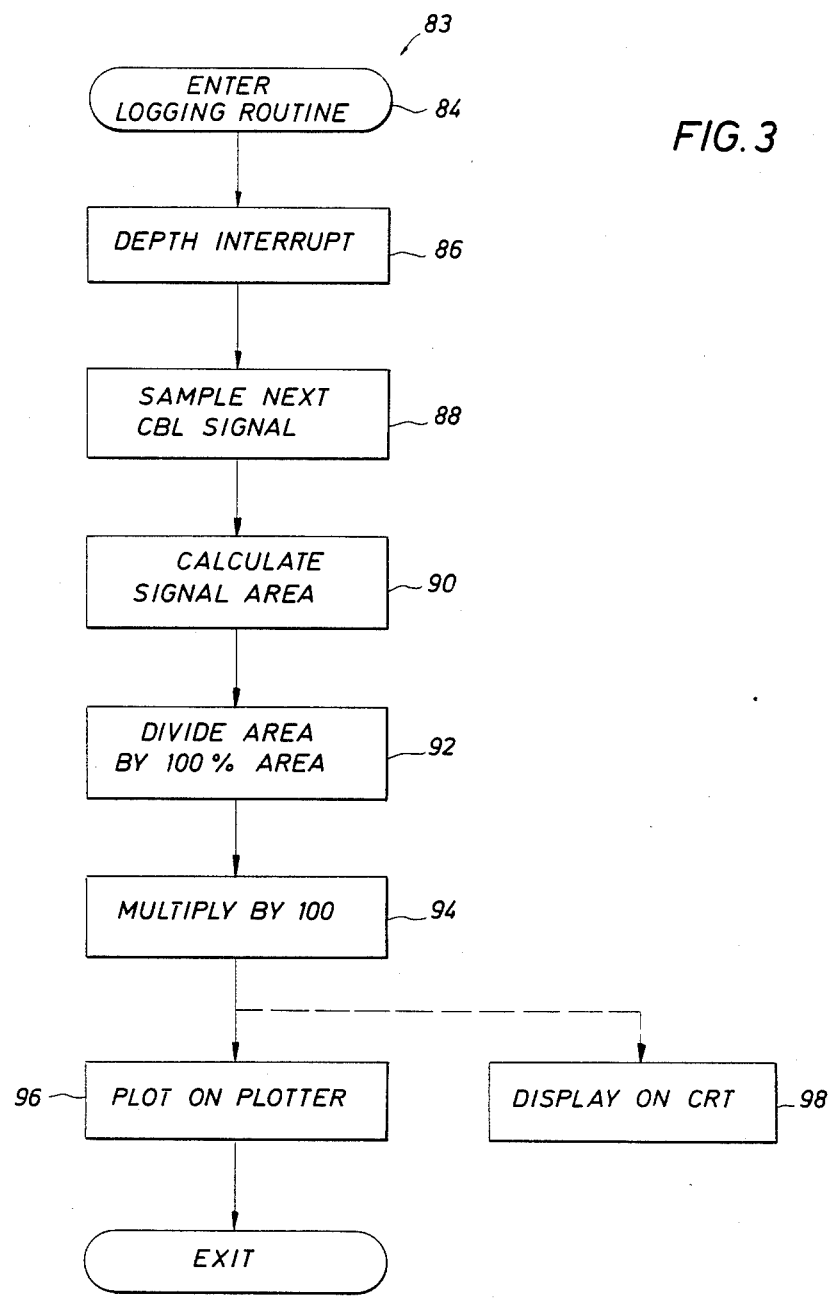
FIG. 3 is a flow chart of the processing of signals from the subsurface instrument in accordance with the present invention.

Referring now specifically to FIG. 2, therein is illustrated a flow diagram of the calibration system utilized in the practice of the preferred embodiment of the well-logging system of the present invention. The calibration routine is entered 46 into the CPU 30 and a survey signal is taken 48 within the above-described section of free casing, such survey signal preferably commencing with a sync pulse representing the activation of transmitter 16. This survey signal is of a predetermined duration, preferably of a duration less than the period between consecutive activations of transmitter 16, most preferably a duration of 1350 microseconds.

This survey signal passes through the PGA 36 and is digitized by the A/D converter 38. The digitized signal is entered directly into the memory 42 by means of DMA 40. In the preferred embodiment of the invention there is a delay between the sync pulse and the time at which the digitizing of the signal begins. Because of the travel time of the energy to reach receiver 18 from transmitter 16, no data of interest to the cement bond logging operation will occur immediately following the activation of transmitter 16. Therefore, a delay before digitizing, preferably of approximately 84 microseconds, is added to save processing time and memory space.

In the preferred embodiment, the input range of the A/D convertor 38 is ±5 volts. Therefore if the amplitude excursion of the signal is greater then ±5 volts, the A/D converter 38 will truncate, or clip, the signal, digitizing any excursion greater than ±5 volts as 5 volts. Because the cement bond logging operation is interested in the size and shape of the signal alternations, this clipping of the signal by the A/D converter 38 is detrimental to the logging operation. Therefore, a procedure is included in the calibration routine for eliminating such clipping and insuring that during logging the entire signal is accurately digitized. Parameter A, representing the maximum amplitude excursion of one polarity of the survey signal 50 within memory 42, is determined. A determination 52 is made as to whether parameter A is equal to ±5 volts. If the determination 52 is YES, the program reduces the gain of the PGA 36 by a predetermined factor, preferably $\sqrt{2}$, another sample is taken 48, and the loop continues until parameter A is less than a ±5 volts excursion and a NO determination is made. A second determination 56 is then made as to whether the signal is less than ±5 volts by a factor greater than a pre-determined factor, again preferably $\sqrt{2}$. If YES, the gain of PGA 36 is increased by the pre-determined factor 58, another sample is taken 48, and this second loop is repeated until the second determination 56 is also NO. This procedure assures that the digitized signal is scaled approaching, but not equaling, ±5 volts. As stated above, due to the relatively minimal attenuation of the acoustic energies while traversing this free casing, the signal alternations will be at a maximum relative amplitude and therefore the signal gain established during the above procedure should insure that no amplitudes observed under routine logging conditions are clipped by operation of the A/D converter.

Parameter B, representing a first significant arrival of the signal, is then located 60. In the preferred embodiment, the first significant arrival is a positive amplitude or half-cycle, preferably the first positive amplitude of a given value relative to parameter A, most preferably the first positive amplitude greater than onethird the positive amplitude of parameter A. Although the preferred embodiment utilizes the positive amplitudes of the alternations in determining the first significant portion of the signal, in an alternative embodiment it would be equally satisfactory to utilize the negative amplitudes instead.

Once the first significant arrival has been located, a starting memory address (SMA) is established at the positive-going zero crossing of parameter B 62, where the first significant arrival crosses in a positive direction the zero reference axis. An ending memory address (EMA) is then established at the negative-going zero crossing of parameter B 64. These memory addresses represent time relative to the sync pulse, therefore these addresses represent the same portion of time after the sync pulse of any given sample. All digitized positive amplitudes within this first significant portion are then summed together to yield a functional indication of the area beneath such positive amplitudes. The time (T) between this starting memory address and the ending memory address is equal to a selected one-half cycle of the alternations of the signal from the subsurface instrument 14. A period is then defined beginning one-quarter cycle before the starting memory address, SMA $-\frac{1}{2}$T, and ending one-quarter cycle after the ending memory address, EMA $+\frac{1}{2}$T. This period is defined as the first significant portion of the signal. It is to be understood that since the starting memory address and ending memory address represent time after the sync pulse, this first significant portion of the signal is a specific duration of time commencing at SMA $-\frac{1}{2}$T after the sync pulse of any given sample. All digitized positive amplitudes within this first significant portion are then summed together to yield a functional indication of the area beneath such positive amplitudes. It is to be similarly understood that in an alternative embodiment this first significant portion may be defined in reference to a plurality of the early signal arrivals rather than to just the first significant arrival. However, to maintain ideal accuracy of the determinations to be made in accordance with this first significant portion, such determinations to be described herein below, the arrivals contained within the first significant portion should consist essentially of the casing arrivals and not discernibly of any formation arrivals.

Because this calibration is made within free, or at least relatively free, casing, the amplitudes representing the casing arrivals are at their relative maximum, therefore the area of the curve beneath these amplitudes is also at its relative maximum, or 100% of the area to be encountered during the cement bond logging operation at least so long as it is conducted within the same well and within the same size and weight of casing. Once this maximum area has been determined, another sample is taken 68 and the area of the first significant arrival is determined 70 exactly as was done previously. This second area determination is then divided 72 by the maximum area determination 66 made previously and the quotient multiplied by one hundred (element 74) to give a percentage representation of the degree of abscence of cementcasing bonding present. This representation is then displayed on the CRT 76. Because both measurements were taken under the same conditions of free casing, the quotient of the division will be at least closely proximate one and the percentage representation of unbonded casing should be similarly proximate to 100%.

To perform the cement bond logging operation, subsurface instrument 14 is placed at one extreme of the zone of the well to be logged, preferably at the lower extremity of such zone. The logging routine is entered 84 into the CPU 30 and subsurface instrument 14 is caused to traverse the zone of interest with the transmitter 16 cyclically activated at the predetermined repetition rate. The acoustic energies released by transmitter 16 reach receiver 18 and are converted into electrical signals in the manner described above. The depth recorder 28 determines the incremental travel of subsurface instrument 14 within the well 12 and inputs a depth interrupt to the CPU 30 at the desired survey depth increments. Upon the receipt of each of these depth interrupts, the CPU 30 selects survey signals by instructing the sync detector 35 to sample the signal 88 beginning at the next sync pulse after the depth interrupt and to pass that signal on to the remainder of the surface electronics 23 where the signal is amplified, digitized and placed in memory in the manner described above. The CPU 30 sums the digitized significant amplitudes, which in the preferred embodiment are the positive amplitudes occuring during the first significant portion of the signal as described above. This summing functionally indicates the area of such amplitudes as described above. This area is then divided by the 100% area 92 established during calibration to obtain its proportional relation thereto. The quotient is multiplied by one hundred for a percentage unbonded indication which is graphically represented on plotter 96. The CRT 98 may also be utilized at this time if an immediate presentation is desired.

Thus, there has been described and illustrated herein, a system in accordance with the present invention where a new method and apparatus are described which provide data representative of the degree of bonding of a cement annulus to casing in a borehole, such method comprising the use of a subsurface instrument and surface electronics and such method minimizing the effects of signal noise upon the data. However, those skilled in the art will recognize that obvious modifications can be made to the preferred embodiment without departing from the spirit of the invention. For example, the signal from the subsurface instrument may be recorded on tape or by other suitable means for processing remote from the well site. Additionally, the determination of 100% area could be entered into the calibration system from empirically derived tables or nomographs rather than by calibration in free casing within the well. Furthermore, although the preferred embodiment utilizes surface located means for digitizing and processing the signals from the receiver, it is obvious that such means could be located within the subsurface instrument. Accordingly, it should be clearly understood that the forms of the invention described herein are exemplary only and are not intended as limitations on the scope of the present invention.

The embodiment of the invention in which an exclusive property or privilege is claimed is defined as follows:

1. A method of detecting the relative degrees of bonding of cement to casing in a borehole, comprising the steps of:
   traversing said borehole with an instrument, said instrument adapted to periodically transmit acoustic energies through said casing and to receive said acoustic energies at a fixed distance within said instrument from the location of said transmission of said acoustic energies;
   transforming said received acoustic energies into a plurality of electrical signals, each electrical signal comprising both a pulse functionally related to the time of said transmission of said acoustic energies and a plurality of electrical alternations about a reference axis representative of said acoustic energies received by said instrument subsequent in time from said transmission;
   selecting survey signals from said plurality of electrical signals;
   digitizing at least a portion of each of said selected survey signals;
   selecting at least one of said digitized survey signals to be used as a calibration signal;
   selecting at least one half-cycle of one polarity of said calibration signal;
   determining time references for said at least one half-cycle, said time references being a function of coincidence of said at least one half-cycle and said reference axis;
   defining a portion of each of said survey signals in reference to said time references of said half-cycle of said calibration signal;
   determining the area within said half-cycle in relation to said reference axis of said calibration signal;
   summing the individual amplitudes within said defined portion of said survey signals, said ampitudes having the same polarity as said half-cycle of said calibration signal, said polarity determined relative to the references axis of said survey signals;
   determining from said summation of individual amplitudes the area defined by said individual amplitudes in said survey signals; and
   determining from said area of said half-cycle of said calibration signal and said area within said defined area within said portions of each of said survey signals the relative degrees of bonding of cement to casing.

2. The method of determining the relative degrees of bonding of cement to casing in a borehole of claim 1, wherein the step of selecting survey signals comprises selecting said survey signals from said plurality of electrical signals at known survey intervals, said survey intervals determined in accordance with the incremental travel of said instrument within said borehole.

3. The method of determining the relative degrees of bonding of cement to casing in a borehole of claim 1, wherein the step of selecting a calibration signal comprises selecting a signal representative of acoustic energies traversing a portion of said casing wherein the relative degree of bonding of said cement annulus to said casing is at least approximately known.

4. The method of determining the degrees of bonding of cement to casing in a borehole of claim 3, wherein the step of selecting a calibration signal further comprises locating a portion of said casing which is at least relatively unbonded to said cement annulus.

5. The method of determining the relative degrees of bonding of cement to casing in a borehole of claim 1, wherein the step of selecting at least one half-cycle of said calibration signal comprises the steps of:
   determining the maximum amplitude excursion of said plurality of alternations within said electrical signal, said maximum amplitude excursion determined relative to the reference axis of said calibration signal; and
   locating within said calibration signal the first alternation of a known amplitude relative to said maximum amplitude excursion within said calibration signal.

6. The method of determining the relative degrees of bonding of cement to casing in a borehole of claim 1, wherein the step of defining said portion of said survey signals comprises the steps of:
   determining the two relative points in time at which said half-cycle intersects with said reference axis of said calibration signal; and
   defining said portion of said calibration signal as commencing onequarter cycle before the first point at which said half-cycle intersects said reference of said calibration signal and terminating onequarter cycle after the second point at which said half-cycle intersects said reference axis of said calibration signal.

7. The method of determining the relative degrees of bonding of cement to casing in a borehole of claim 1, wherein the step of determining the area beneath said half-cycle of said calibration signal comprises summing the digitized amplitudes forming said half-cycle of said calibration signal.

8. The method of determining the relative degrees of bonding of cement to casing in a borehole of claim 1, wherein the step of determining the area within said amplitudes within said portions of said survey signals comprises summing the digital representations of said amplitudes within said portions of said survey signals.

9. The method of determining the relative degrees of bonding of cement to casing in a borehole of claim 1, wherein the step of determining the relative degrees of bonding of cement to casing comprises:
   comparing said area of said half-cycle of said calibration signal and said area within said defined area within said portions of each of said survey signals; and
   determining from the comparison of said areas a value indicative of the relative degree of bonding of cement to casing for each of said survey signals to said calibration signal.

* * * * *